(12) United States Patent
Venditti et al.

(10) Patent No.: US 7,606,789 B2
(45) Date of Patent: Oct. 20, 2009

(54) DATA ACCESS AND RETRIEVAL MECHANISM

(75) Inventors: Stephen Venditti, Norwood, MA (US); William Olsen, Bridgewater, MA (US); Sean Hegarty, Newton, MA (US); Christopher Twombly, Arlington, MA (US)

(73) Assignee: Iron Mountain Incorporated, Boston, MA (US)

( * ) Notice: Subject to any disclaimer, the term of this patent is extended or adjusted under 35 U.S.C. 154(b) by 427 days.

(21) Appl. No.: 10/713,416

(22) Filed: Nov. 14, 2003

(65) Prior Publication Data

US 2005/0108205 A1    May 19, 2005

(51) Int. Cl.
*G06F 17/30* (2006.01)
(52) U.S. Cl. ............................................. 707/3
(58) Field of Classification Search ............. 707/1, 707/2, 9, 10, 200, 3, 104.1, 102; 709/224
See application file for complete search history.

(56) References Cited

U.S. PATENT DOCUMENTS

| | | | |
|---|---|---|---|
| 5,222,234 A * | 6/1993 | Wang et al. ............... | 707/3 |
| 5,790,790 A | 8/1998 | Smith et al. | |
| D399,836 S | 10/1998 | Wu et al. | |
| 6,061,448 A | 5/2000 | Smith et al. | |
| 6,119,137 A | 9/2000 | Smith et al. | |
| 6,151,675 A | 11/2000 | Smith | |
| 6,192,407 B1 | 2/2001 | Smith et al. | |
| 6,385,655 B1 | 5/2002 | Smith et al. | |
| 6,405,206 B1 * | 6/2002 | Kayahara ............... | 707/102 |
| 6,405,265 B1 | 6/2002 | Kronenberg et al. | |
| 6,470,086 B1 | 10/2002 | Smith | |
| 6,487,599 B1 | 11/2002 | Smith et al. | |
| 6,502,191 B1 | 12/2002 | Smith et al. | |
| 2002/0069266 A1 | 6/2002 | Lakhdrhir | |
| 2002/0144246 A1 | 10/2002 | Yu | |
| 2002/0186241 A1 | 12/2002 | Kohda et al. | |
| 2002/0194195 A1 * | 12/2002 | Fenton et al. ............ | 707/104.1 |
| 2002/0194366 A1 | 12/2002 | Bodin et al. | |
| 2003/0046281 A1 * | 3/2003 | Son ............................ | 707/6 |

\* cited by examiner

*Primary Examiner*—Etienne P LeRoux
(74) *Attorney, Agent, or Firm*—Finnegan, Henderson, Farabow, Garrett & Dunner, LLP

(57) ABSTRACT

Methods and apparatus are provided for preserving electronic resources identified as search results in a system location, such as a system folder. In one embodiment, a computer-implemented method comprises executing a search query on a data collection to produce at least one search result, the search query specifying at least one criterion, each of the at least one search results representing a resource which satisfies the at least one criterion; providing an input mechanism by means of which a user may select at least one resource for preservation; and executing, in response to the user's selection, a command to preserve the selected at least one resource in a system location.

48 Claims, 19 Drawing Sheets

SEARCH RESULTS

| Availability | Date | From | Subject | To |
|---|---|---|---|---|
| Immediate | 07/10/2003 09:23 AM | "pop60" <pop60@ironmountai... | | "pop98" <pop98@ironmou... |
| Immediate | 07/10/2003 09:24 AM | "pop83" <pop83@ironmountai... | NYSBD APPLICATION COVERING... | "pop78" <pop78@ironmou... |
| Immediate | 07/10/2003 09:24 AM | "pop74" <pop74@ironmountai... | RE: Sign off letter | "pop44" <pop44@ironmou... |
| Immediate | 07/10/2003 09:24 AM | "pop20" <pop20@ironmountai... | NRI Letter | "pop11" <pop11@ironmou... |
| Immediate | 07/10/2003 09:24 AM | "pop57" <pop57@ironmountai... | RE: FSA sign-off letter: N... | "Nancy" <ccc50@girli... |
| Immediate | 07/10/2003 09:23 AM | "pop52" <pop52@ironmountai... | RE: FSA sign-off letter: N... | |
| | | | Side letter for Tenants In... | "pop98" <pop98@ironmou... |

(items found: 67)

Columns labeled: S11A, S11B, S11C, S11D, S11E, S11F
Rows labeled: S14A, S14B, S14C, S14D, S14E, S14F

DATA ACCESS AND RETRIEVAL MECHANISM

FIELD OF THE INVENTION

This invention relates to computer software, and more particularly to computer software used to facilitate data access and retrieval.

BACKGROUND OF INVENTION

It is well-known that information produced and stored in electronic form is expanding at an ever-increasing rate. Entire industries have sprung up to provide tools for harnessing this "information explosion," including electronic storage systems, database management systems, and others. In addition, Internet-based technology has made information, on the World Wide Web (WWW) and/or private networks, extremely accessible to the average user. Nevertheless, it is also well-known that the growth in the amount of information available can make a user's search for specific and/or relevant information extremely difficult.

Search engines have become very popular tools for finding relevant information resources, and a wide variety of search engines are available. In general, search engines execute algorithms that determine the relevance of information resources in a body of information (hereinafter a "data collection"), based on search criteria specified by a user. Each search engine implements a different algorithm to "score" (i.e., assign a measurement of relevance to) the resources in a data collection. Resources deemed sufficiently relevant are provided to the user as "search results," often in the form of HTML hyperlinks to the resources. However, the effectiveness of a search engine can be limited by the data collection itself. In particular, because resources may be added, deleted and/or modified at any time, a search query executed on a data collection containing these resources at one time may produce one set of results, and at another time produce quite a different set of results. Thus, a user who finds a relevant resource by executing a search query may fail to find the resource again by re-executing the same query, even if the second execution of the query occurs a short time after the first. Even more problematic, the user may not recall the precise details of the search query, and thus may not be able to re-execute it.

While these inadequacies are significant with respect to providing access to public information resources (e.g., those available via the WWW), they are perhaps even more substantial with respect to providing access to private resources (e.g., those used by individual businesses and other organizations). An organization's private resources may contain information which is of great importance to its overall success, and which is needed for specific endeavors. For example, an organization involved in a litigation must be able to quickly and easily access information resources which are relevant to the suit. Because it may not be immediately apparent which resources are relevant, a search for relevant resources may be required. Once the relevant resources are identified, users may need to access them on a recurring basis, and may require that retrieval be quick and easy.

Private resources may require other storage and retrieval capabilities not required for public information resources. For example, private resources may need to be archived (e.g., on storage media which do not provide direct access, such as magnetic tape) for long periods, yet retrieved quickly when needed. Access to specific private resources may need to be restricted to only certain individuals. Users may also need the capability to specify that certain private resources should not be modified and/or destroyed.

SUMMARY OF THE INVENTION

In one embodiment, a computer-implemented method is provided for facilitating access to a resource which is included in a data collection, the resource comprising a self-contained module of data, the data collection comprising a plurality of resources, the method comprising acts of: (A) executing a search query on the data collection to produce at least one search result, the search query specifying at least one criterion, each of the at least one search results representing a resource which satisfies the at least one criterion; (B) providing an input mechanism by means of which a user may select for preservation at least one resource from the data collection; and (C) executing, in response to the user's selection, a command to preserve the selected at least one resource in a system location. The method may be performed by providing a system location which comprises a folder, which may be created based on input provided by the user.

In another embodiment, a computer-readable medium is provided that is encoded with instructions which, when executed by a computer, perform a method for facilitating access to a resource which is included in a data collection, the resource comprising a self-contained module of data, the data collection comprising a plurality of resources, the method comprising acts of: (A) executing a search query on the data collection to produce at least one search result, the search query specifying at least one criterion, each of the at least one search results representing a resource which satisfies the at least one criterion; (B) providing an input mechanism by means of which a user may select for preservation at least one resource from the data collection; and (C) executing, in response to the user's selection, a command to preserve the selected at least one resource in a system location. The computer-readable medium may comprise instructions for providing a system location which comprises a folder, which may be created based on input provided by the user.

In yet another embodiment, a system is provided for facilitating access to a resource which is included in a data collection, the resource comprising a self-contained module of data, the data collection comprising a plurality of resources, the system comprising: a search controller to execute a search query on the data collection to produce at least one search result, the search query specifying at least one criterion, each of the at least one search results representing a resource which satisfies the at least one criterion; an input controller to provide an input mechanism by means of which a user may select, from the at least one search result produced by the search controller, at least one resource from the data collection for preservation; and a command controller to execute, in response to the user's selection provided to the input controller, a command to preserve the selected at least one resource in a system location.

BRIEF DESCRIPTION OF DRAWINGS

For purposes of clarity, not every component may be labeled in every drawing. In the drawings, in which each like components are represented by like numerals:

FIG. 4 is an illustration of an exemplary user interface used to initiate a search according to some embodiments of the invention;

FIG. 5 is an illustration of an exemplary user interface used to display search results to a user according to some embodiments of the invention;

FIG. 6 is an illustration of an exemplary user interface by means of which a user may indicate specific search results to preserve, according to some embodiments of the invention;

FIG. 20 is an illustration of an exemplary user interface by means of which a user may confirm details of an export of a set of resources, according to some embodiments of the invention.

DETAILED DESCRIPTION

I. Overview

Figure 1:
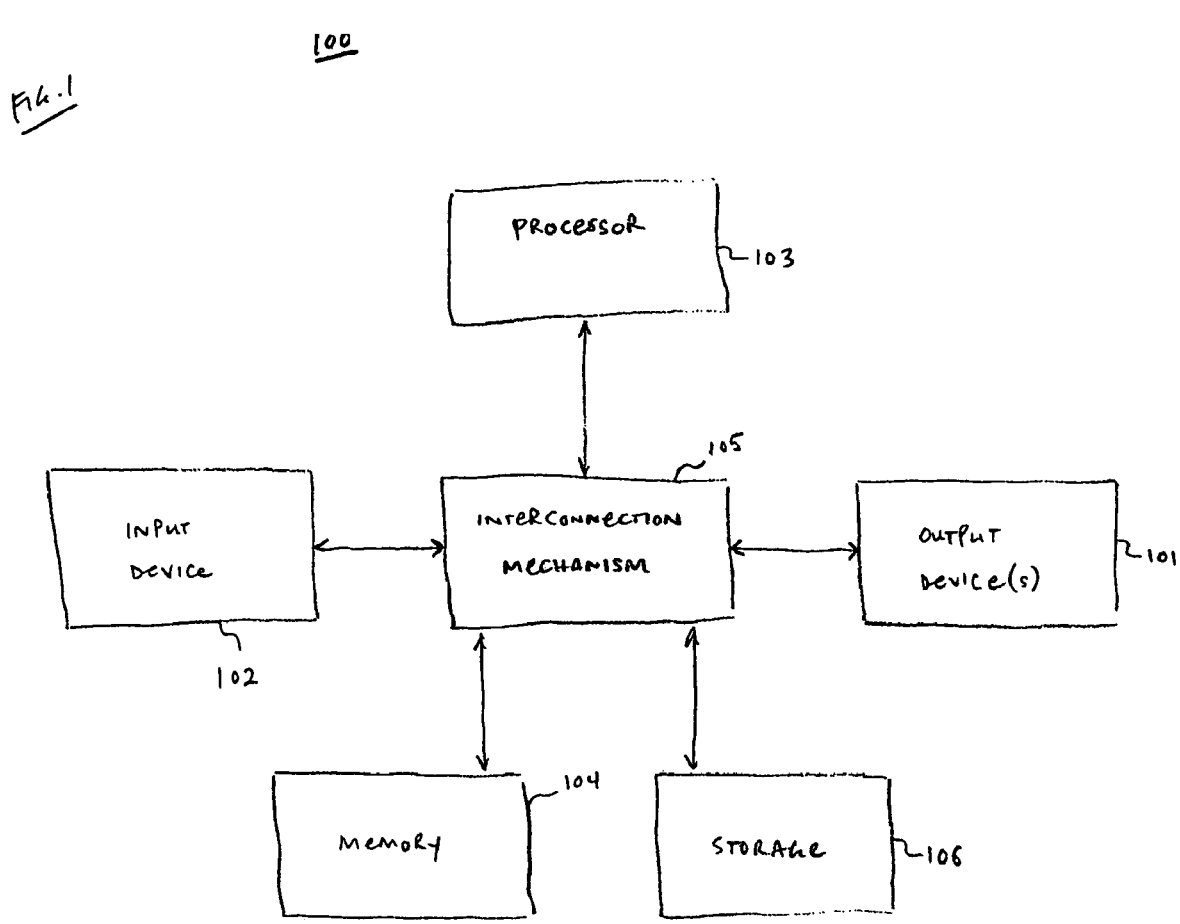
FIG. 1 is a block diagram of an exemplary computer system, with which embodiments of the invention may be implemented.

According to some embodiments of the invention, methods and apparatus are provided which enable a user to search for information resources, and preserve an identification of one or more of those information resources (i.e., as search results) in a system location for subsequent retrieval. That is, upon executing a search query, a user may elect to preserve one or more resources identified as search results, so that the user need not re-execute the query each time the user desires access to the resources. Instead, the user may retrieve the resources at any time by accessing the system location. Resources may be maintained in the "state" at which they existed at the time of preservation (i.e., their content may be preserved as it existed as of the time of preservation).

In some embodiments, a system location need not comprise a physical storage location (e.g., a file maintained by a file system), as it may comprise a "logical" system location provided by one or more data structures. For example, a system location may comprise a "folder" presented to a user via a graphical user interface (GUI), whose contents (e.g., search results, actual resources, or other data) have a logical relationship with the folder which is implemented with, for example, data stored in one or more persistent data stores, such as relational database tables. A system location may be provided in any of numerous ways, as the invention is not limited to a particular implementation.

In some embodiments, when a user elects to preserve a resource identified by a search, the user selects a search result which identifies the resource, and issues a command or provides an indicator (e.g., using a GUI provided for this purpose) to preserve the search result in a system location.

In some embodiments, a user may perform various operations on a resource residing in a system location, and each of these operations may be thought of as an operation which may preserve the resource. In one example, a resource may be copied and/or moved to another system location. When a resource is copied and/or moved to another location, the resource may or may not be physically duplicated in the "new" (i.e., destination) system location. If the resource is physically duplicated, the operation may create a "snap shot" of the resource, thereby preserving the resource in the "state" in which it existed at the time of the operation, while the "original" resource may continue to be accessed and/or modified, if desired. Of course, the resource need not be physically duplicated to be stored in the new location, as an association between a resource and its new location may be implemented logically. For example, a data structure, such as one or more persistent data stores such as relational database tables, may be updated to provide a logical relationship between the resource and the new location.

In another example, a user may specify that a resource be exported to any of numerous media. For example, a resource may be exported to CD-ROM, hard copy, and/or any other form. Thus, the resource may be preserved in the state in which it existed at the time of export, while the "original" resource residing on the system may continue to be accessed and/or modified, if desired.

Various aspects of the methods and apparatus for practicing features of the invention may be implemented on one or more computer systems, such as the exemplary computer system 100 shown in FIG. 1. Computer system 100 includes input device(s) 102, output device(s) 101, processor 103, memory system 104 and storage 106, all of which are coupled, directly or indirectly, via interconnection mechanism 105, which may comprise one or more buses, switches, and/or networks. The input device(s) 102 receive(s) input from a machine or user (e.g., a human operator), and output device(s) 101 display(s) or transmit(s) information to a user or machine (e.g., a liquid crystal display, printer, etc.). The processor 103 typically executes a computer program called an operating system (e.g., a Microsoft Windows®-family operating system or other suitable operating systems) which controls the execution of other computer programs, and (as it is well-known) provides scheduling, input/output and other device control, accounting, compilation, storage assignment, data management, memory management, communication and data flow control functions. Collectively, the processor and operating system define the computer platform for which application programs in other computer programming languages are written.

The processor 103 may also execute one or more additional computer programs to implement various functions. These computer programs may be written in any type of computer programming language, including a procedural programming language, object-oriented programming language, macro language, or any combination thereof. These computer programs may be stored in storage system 106. Storage system 106 may hold information on a volatile or non-volatile medium or both, and may be fixed, removable, or a combination thereof. Storage system 106 is shown in greater detail in FIG. 2.

Figure 2:
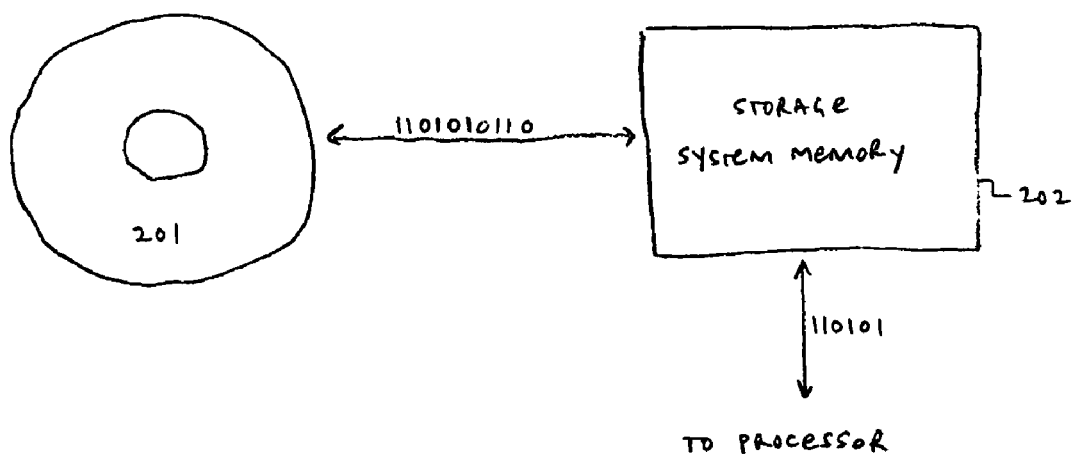
FIG. 2 is a block diagram of an exemplary computer memory, on which programmed instructions comprising embodiments of the invention may be stored.

Storage system 106 typically includes a computer-readable and -writeable non-volatile recording medium 201, on which signals are stored that define instructions forming a computer program, information to be used by the program, or both. The medium may, for example, be a disk or semiconductor (e.g., flash or optical memory), or combination thereof. Typically, in operation, the processor 103 causes data to be read from the non-volatile recording medium 201 into a volatile memory 202 (e.g., a random access memory, or RAM) that allows for faster access to the information by the processor 103 than does the medium 201. This memory 202 may be located in storage system 106, as shown in FIG. 2, or in memory system 104, as shown in FIG. 1. The processor 103 generally manipulates the data within the integrated circuit memory 104, 202 and then copies the data to the medium 201 after processing is completed. A variety of mechanisms are known to digital systems engineers for managing movement of data between the medium 201 and the integrated circuit memory element 104, 202, and the invention is not limited to any particular implementation. The invention is also not limited to a particular memory system 104 or storage system 106.

Aspects of embodiments of the invention may be implemented in computer programs, hardware, firmware, or a combination thereof. The various elements of an embodiment, either individually or in combination, may be implemented as a computer program product including a computer-readable medium on which signals comprising instructions are stored for access and execution by a processor. When executed by the computer, the instructions instruct the computer to perform the various steps of the process.

II. Data Access, Retrieval and Export

According to some aspects of the invention, the identity and content of one or more resources identified by a search query may be preserved, or set aside, at a specified system location, such as in a folder. These resources may thereafter be accessed at any time, regardless of changes to the resource content or existence which may otherwise make it impossible to repeat the search query retrieve the identical resources.

Figure 3:
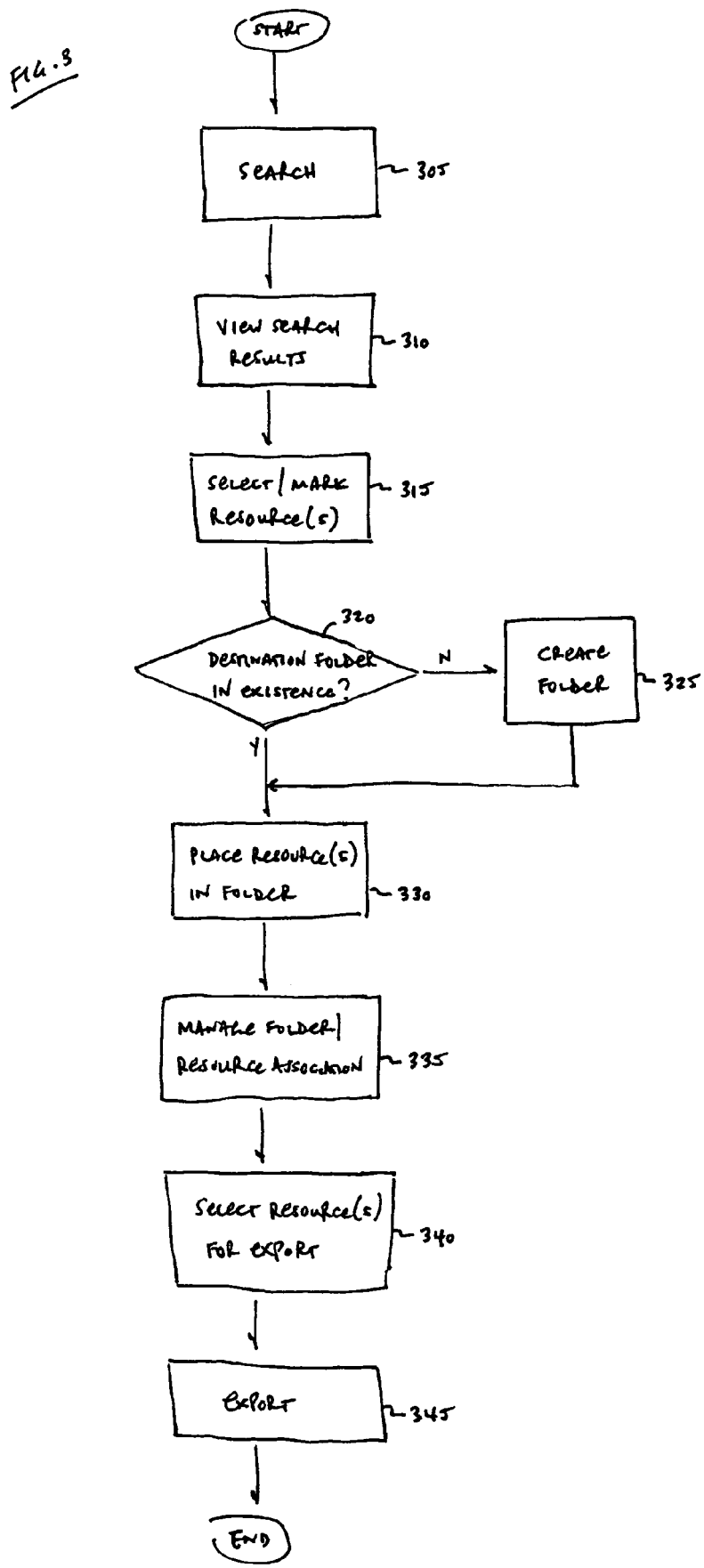
FIG. 3 is a flow chart depicting a process for data access and/or retrieval according to some embodiments of the invention.

An exemplary method for accessing and preserving resources according to some embodiments of the invention is depicted in FIG. 3. Many of the features of the invention, and the various techniques for implementing them, are described herein with reference to FIG. 3.

Upon the start of the process, a search is executed for resources stored in a data collection in act 305. This may be performed in any of numerous ways, as the invention is not limited to a particular implementation. Numerous search tools are available, including search engines (e.g., Google, AltaVista, etc.) and other resource discovery tools which may be useful for mining a data collection. For example, many database management systems may provide search capabilities. For example, the Oracle 9 relational database management system (RDBMS) provides a programming interface which may accept a search query created and issued by a user via a graphical user interface (GUI).

Figure 4:
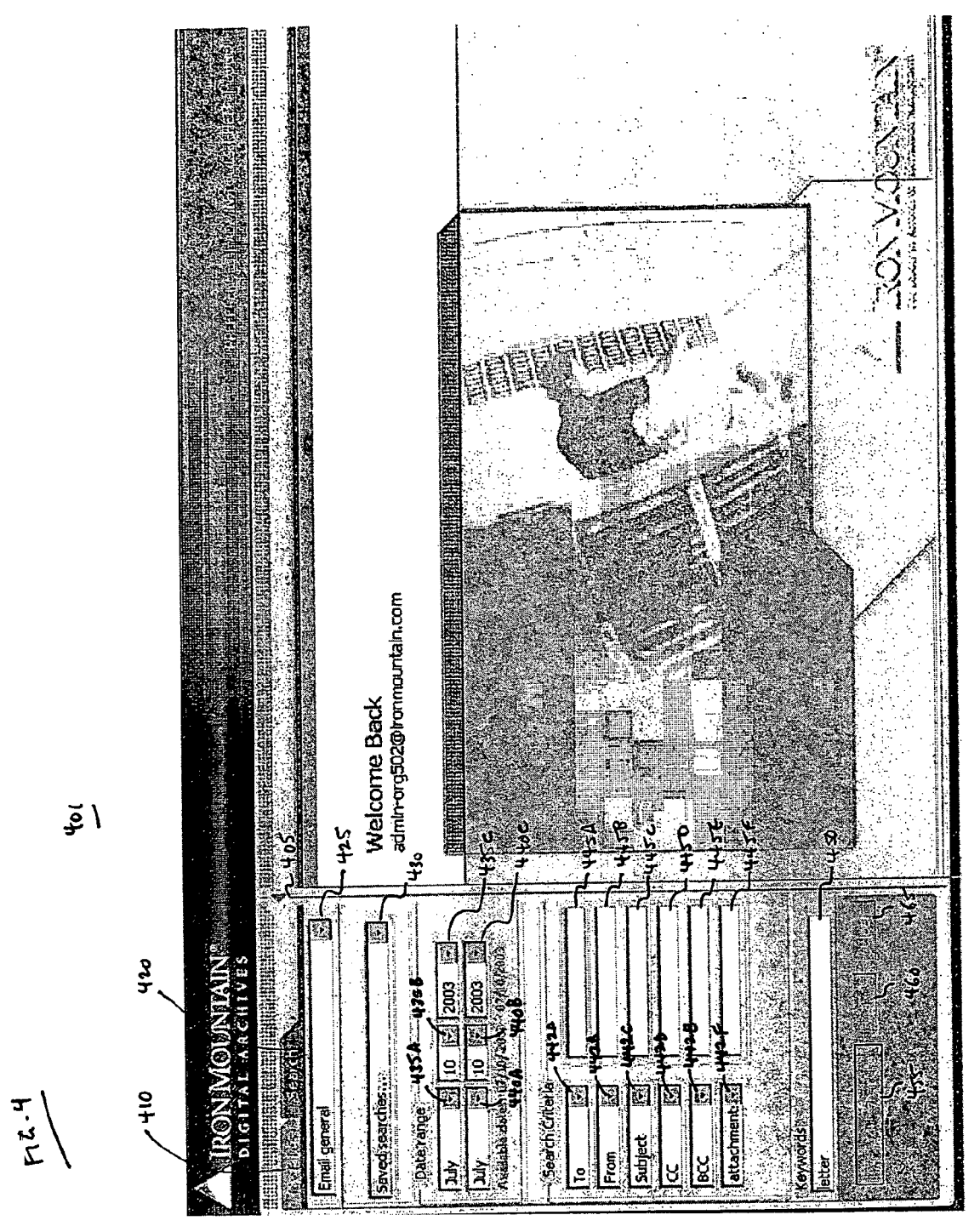

One example of such a GUI is interface 401, shown in FIG. 4. Interface 401 may be implemented in various ways. For example, interface 401 may comprise an application executing in a window in accordance with a Microsoft Windows®-family operating system, or interface 401 may be a page, encoded in HTML or other markup language format, which is accessible via a browser or other suitably configured interface. One skilled in the art can readily write the computer program code required to implement the interface 401, as well as other features and functions described herein.

Interface 401 provides information using tab and folder metaphors, as well as drop-down boxes and buttons, which are well-known in the art. Specifically, interface 401 includes tabs 410 and 420, by means of which a user may view saved resources (e.g., by clicking the "My Files" tab 410, which is discussed below with reference to FIG. 8), or initiate a search (e.g., by clicking the "Search" tab 420). In the example shown, a user has selected tab 420, thus displaying the drop-down boxes and buttons shown.

Each of the illustrated drop-down boxes and buttons allows a user to specify a search criterion. For example, drop-down box 425 allows a user to specify a specific resource format (e.g., e-mails, documents, spreadsheets, etc.) for which a query should search. Drop-down box 430 allows a user to select from previously created search criteria, which may have been created by the user employing interface 401, or which may have been provided in some other manner. For example, predefined search criteria may be provided (e.g., by an administrator) for all users to employ. Boxes 435 and 440 allow a user to specify a date range, during which a resource should have been created or catalogued in order to be represented in search results.

In the example shown, interface 401 includes boxes 442A-442F and 445A-445F, which allow a user to specify criteria by which e-mail resources are selected for inclusion in search results. In some embodiments, boxes 442 and 445 may not be presented, or may be presented in another format, based on the user's selection in box 425. For example, if a user had selected a different form of resource (e.g., documents) via box 425, a different set of input mechanisms may be provided instead of boxes 442 and 445 (e.g., one or more text boxes which may allow a user to provide content which should be found in documents included in the search results). For example, if a user had chosen to search for documents in box 425, boxes 442 and 445 might not include box 445C, which allows a user to specify a "CC:" (i.e., a so-called "carbon copy") addressee.

Box 450 allows a user to specify one or more "keywords" as search criteria. In some embodiments, a keyword may provide specific text that should be found in the content of resources represented in search results, or it may provide a descriptor for search criteria, or a combination thereof. For example, a keyword phrase "SEC compliance" may specify that search results should include specific resources that must be maintained to comply with SEC regulations, or that search results should include resources containing the actual text "SEC compliance," or that search results should include a combination of these two types. The association between a keyword and a resource may be established in any of numerous ways, such as with the data structure of FIG. 9, which is discussed in detail below.

Upon defining the search criteria, a user may initiate the execution of a search query by clicking button 455. A user may save these criteria (e.g., thereby creating an indication of a saved search, which may subsequently be shown in drop-down box 430) by clicking button 460. A user may clear search criteria from the boxes and drop-down boxes by clicking button 465.

Upon clicking button 455, act 305 (FIG. 3) is commenced. Upon the completion of act 305 (i.e., the completion of the search query), the process proceeds to act 310, wherein a user may view the results of the search query.

Figure 5:
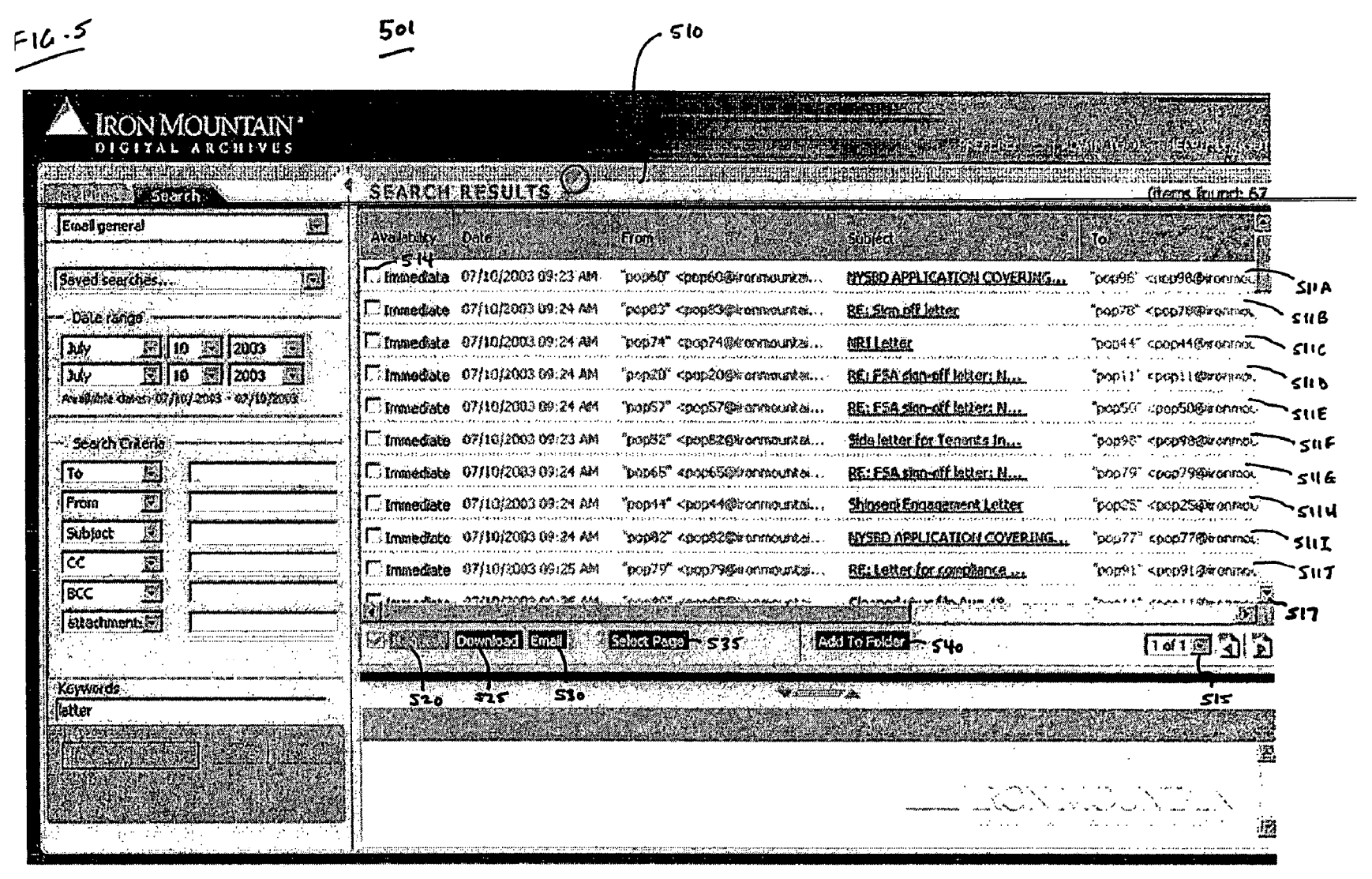

Search results may be provided in any of numerous ways, using any of numerous interfaces. For example, the interface 501, depicted in of FIG. 5, may be employed to display the results of a search query specified in interface 401 (FIG. 4). That is, the search results 511A-511J displayed in interface 501, and more specifically in portion 510, may represent the resources which satisfy the keyword provided in box 450. In the example shown, search results 511A-511J are provided as HTML hyperlinks to the resources, although any form of identifier which facilitates access to the resources (e.g., a universal resource locator, name or identifier) may be employed. The identifier(s) may provide access to resources stored, for example, in the data structure depicted in FIG. 9, discussed in detail below.

Results 511A-511J may comprise a portion of the search results produced in response to the search query, as other search results may appear further down the page within portion 510. In the example shown, these additional search results may be viewed by clicking on scroll-down bar 517 and/or drop-down box 515. Any suitable technique for providing access to search results may be implemented.

A corresponding check box 514 is provided for each of search results 511A-511J. In the example shown, by clicking (i.e., checking) a box 514, a user may select a resource, thereby indicating that an operation should be performed on the resource(s) identified by search results having checked boxes 514. Any of numerous operations may be performed on selected resources, such as the preservation of the resource or a copy thereof (i.e., preserving a "snapshot" of the resource as of the time of preservation) in a system- or user-designated location (e.g., in a specific folder designated by the user). As used herein, "preserving" a resource means the storage of the resource, or a copy thereof, or a pointer thereto.

In some embodiments, by clicking box 535, all of the check boxes 514 shown on the visible page in portion 510 may be selected, such that a user may initiate an operation on all the search results shown without having to check each box 514. Such a "select all" function is a feature routinely found in computer programs.

FIG. 6 shows a portion of interface 501 wherein several resources represented by search results in portion 510 are selected via their respective check boxes 514. Specifically, check boxes 514A-514E have been checked, meaning that the resources represented by search results 511A-511E have been selected. In contrast, check box 514F is not checked, meaning that the resource represented by search result 511F is not selected. When one or more resources 511 have been selected via the respective check boxes 514, the act 315 (FIG. 3) completes.

Figure 7:
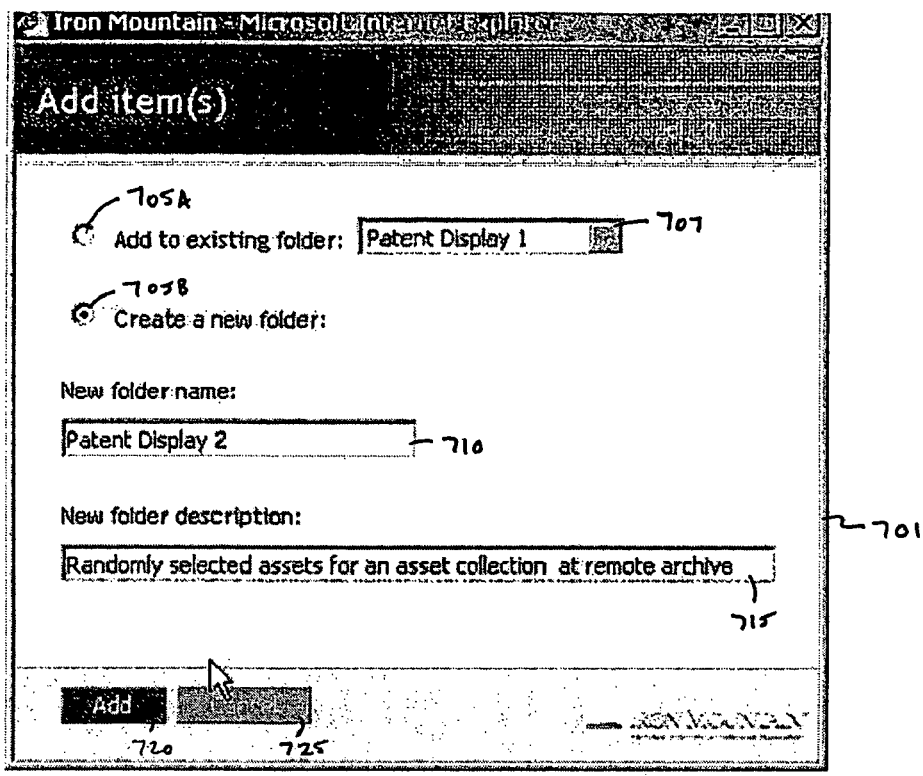
FIG. 7 is an illustration of an exemplary user interface by means of which a user may select a location in which search results should be preserved, according to some embodiments of the invention.

Upon the selection of one or more resources in act 315, a user may preserve the resources in a system- or user-designated system location, such as a folder. (That is, the location is designated before actual preservation occurs.) Accordingly, the process proceeds to act 320, wherein a determination is made as to whether the system location in which the resources are to be preserved exists. In some embodiments, this determination may be made by a user via the interface 701, depicted in FIG. 7. Interface 701 includes buttons 705A and 705B, which allow a user to specify whether the selected resources should be added to an existing folder, or to a folder which does not yet exist. If the user selects button 705A, the process proceeds to act 330, and the user may select an existing folder using drop-down box 707. Upon selecting a folder from drop-down box 707, a user may click box 720 to place the selected resources in the selected folder, and thereby complete act 330. Alternatively, a user may cancel the selection of a folder for selected resources by clicking box 725. Upon clicking box 725, in some embodiments, the user may be returned to the interface 501 shown in FIG. 5 (e.g., to re-perform act 315).

If the user clicks button 705B, the process proceeds to act 325, wherein a new folder may be created. A user may provide a name for the folder using box 710, and/or a description for the folder using box 715. In some embodiments, input provided via boxes 710 and/or 715 may be required before the process may proceed. If so, upon providing this input, a user may create the new folder by clicking button 720, thereby completing the act 330. Again, a user may cancel this specification of a folder for the selected resources by clicking box 725. Upon clicking box 725, in some embodiments, the user may be returned to the interface 501 shown in FIG. 5 (e.g., to re-perform the act 315).

Figure 8:
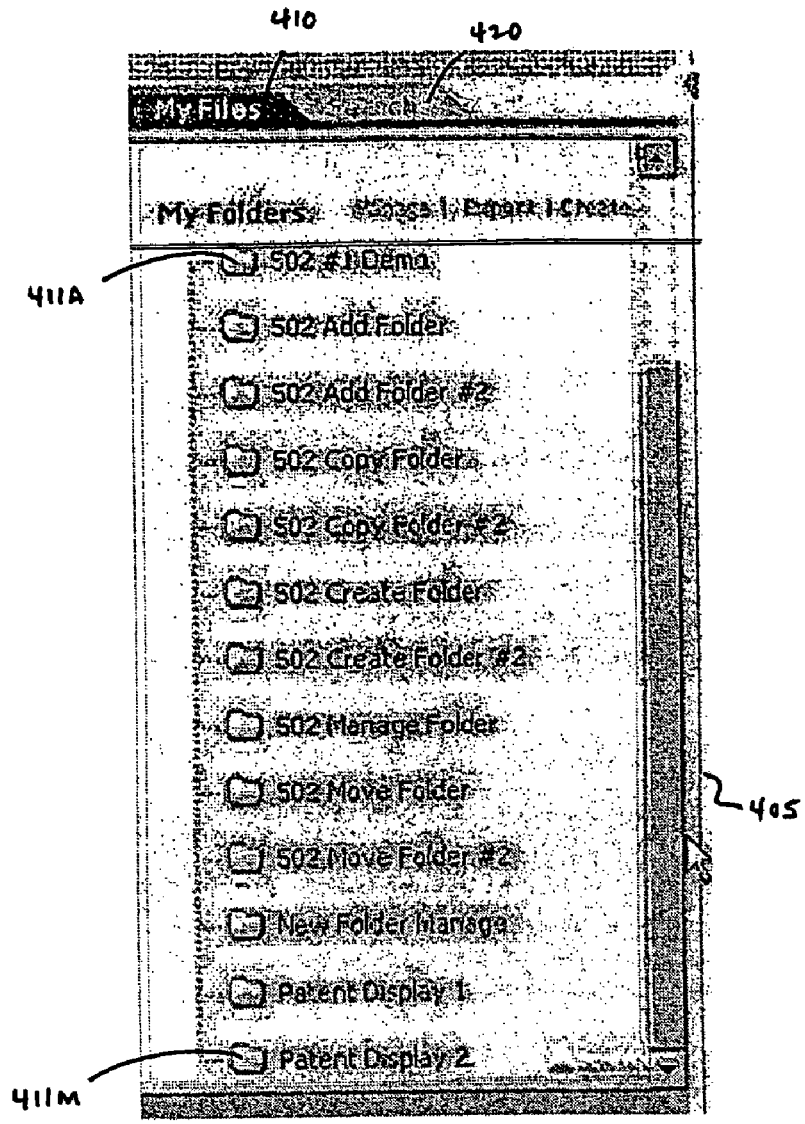
FIG. 8 is an illustration of an exemplary user interface which displays various locations for preserved search results, according to some embodiments of the invention.

FIG. 8 depicts an exemplary interface portion which may indicate the completion of the acts 325 and/or 330. Specifically, FIG. 8 depicts interface portion 405, which may be displayed when a user clicks tab 410 (FIG. 4). In the example shown, clicking the tab 410 displays the folders 411A-411M. Specifically, the folder 411M, named "Patent Display 2," has been created in the act 325, using the interface 701.

Figure 9:
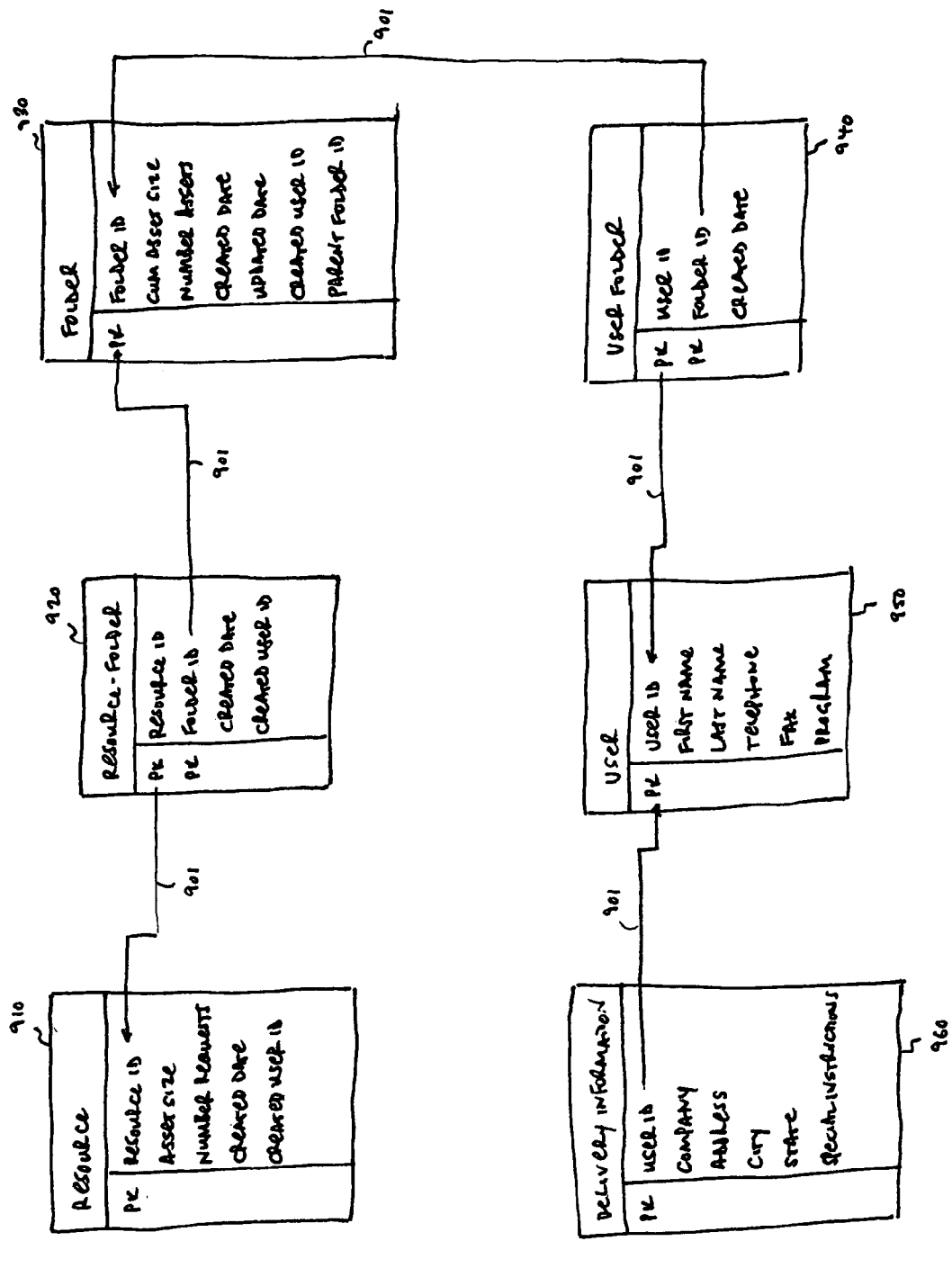
FIG. 9 is a schematic illustration of an exemplary data structure for storing information according to some embodiments of the invention.

In some embodiments, data related to folders, resources, relationships therebetween and various other system functions may be stored in a data structure. In some embodiments, such a data structure may be implemented as a relational database, although the invention is not limited in this respect, as any suitable persistent data store(s) may be employed. A simplified version of a relational database schema which may support various functions described herein is depicted in FIG. 9. It should be appreciated that any of numerous data structures may alternatively be implemented, including another relational database schema, which may include different tables than those shown.

The exemplary data structure 901 shown in FIG. 9 includes resources table 910, resource-folder table 920, folder table 930, user-folder table 940, user table 950 and delivery-information table 960. Each of the tables shown in FIG. 9 contains a number of columns, including at least one which is designated as a primary key ("PK"), meaning that the column(s) store a value which is unique in each row of the table. In addition, some of the columns in each table are logically associated with (i.e., have a "foreign key" to) a column in another table, indicated by arrows 901. A logical association may be established for any of numerous reasons, such as to maintain relational integrity between the tables. For example, the resource-folder table 920 has a column which stores a resource ID for each resource contained therein. This resource ID has a foreign key to the resource ID stored in resource-folder table 910, such that the resource-folder table 920 can never store a resource ID that is not also stored in the resource table 910. In this manner, consistency may be maintained between columns in various tables in the database.

In some embodiments, to preserve one or more resources (e.g., the resources identified by search results 511A-511F, selected using the interface 601 shown in FIG. 6) in a system location such as a folder (e.g., the "Patent Display 2" folder 411M), information may be added to the data structure of FIG. 9. Depending on how the preservation operation is accomplished, the information added to the data structure may vary, and the location within the data structure wherein the information is stored may vary as well. Two techniques for accomplishing the preservation operation are described below.

In one example, wherein the preservation operation does not include a physical duplication of the resources represented by the search results 511A-511B (i.e., a "snap shot" of these resources is not created), no information may be added to the resource table 910, as the existing rows in the table will continue to be the only indication of the considered resources. However, a new row may be added to the folder table 930 to provide an indication of the new folder "Patent Display 2," and two new rows may be added to the resource-folder table 920, each providing an indication of a relationship between the resources and the folder. Specifically, a first row may be added to resource-folder table 920 to provide an indication of a relationship between resource 511A and folder "Patent Display 2," and another row may be added to provide an indication of a relationship between resource 511B and the folder "Patent Display 2."

In another example, wherein the preservation operation includes a physical duplication of the resources represented by search results 511A-511B (i.e., a snap shot of these resources is created as of the time the preservation operation is executed), information may be added to the resource table 910, the resource-folder table 920 and the folder table 930. Specifically, two new rows may be added to resource table 910 to provide new indications of the resources represented by search results 511A-511B, a new row may be added to folder table 930 to provide an indication of the new folder "Patent Display 2," and two new rows may be added to the folder-resource table 920 to provide an indication of the relationship between each of the new entries in the resource table 910 and the new folder.

Creating a snap shot of a selected resource during the preservation operation may be useful in several respects. For example, an indication of the state of the resource as of the time of the preservation may be created, providing an ostensibly permanent record of the resource as it existed at that time. Also, a snap shot may be used as a working copy of the resource, such that modifications may be made to the copy without corrupting the original (or vice versa). In addition, a snap shot may be useful as a measure to prevent the unintentional deletion of data included in the resource. A snap shot may be created in any of numerous ways, including the technique discussed above, as the invention is not limited to a particular implementation.

Upon the completion of act 330, the process proceeds to act 335, wherein the relationships between one or more resources and folders may be changed. In some embodiments, managing the associations between one or more resources and folders in act 335 may include moving a resource from one folder to another, copying a resource from one folder to another, or other operation. The resulting changes to the data structure of FIG. 9, if any, are discussed in relation to each operation.

In some embodiments, a resource may be copied from one folder to another. In some embodiments, the copy operation may be accomplished using the interface 1001, depicted in FIG. 10. Interface 1001 includes tabs 410 and 420 (described above with reference to FIG. 4), and portion 510 (described above with reference to FIG. 5). Portion 510 includes search results 511A-511E, each of which are provided with a check box 514. In the example shown, a user has selected the resources represented by search results 511A-511B by checking boxes 514A-514B. A user may initiate an operation to copy the resources represented by search results selected using their respective boxes 514 to another system location by clicking box 1010. Each of these operations is described below.

Figure 11:
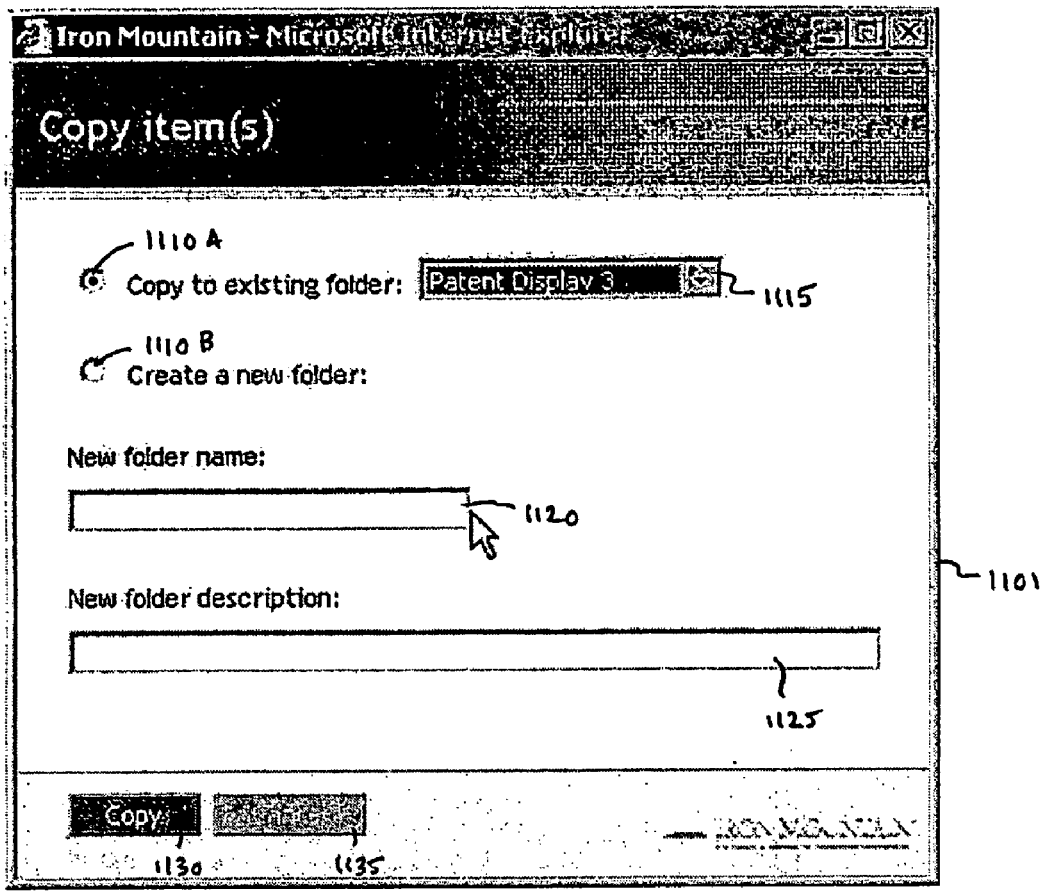
FIG. 11 is an illustration of an exemplary user interface by means of which a user may select a destination for a copied search result, according to some embodiments of the invention.

In some embodiments, clicking box 1010 to initiate a copy operation launches interface 1101, shown in FIG. 11. Interface 1101 includes buttons 1110A and 1110B, with which a user may indicate that a resource represented by a selected search result should be copied to an existing folder or a new folder, respectively. If the user selects button 1110A, drop-down box 1115 may allow the user to select, from a list of pre-existing folders, the folder to which the resource should be copied. If the user selects 1110B, the user may provide a name for a new folder in box 1120, and/or a description for the new folder in box 1125. A user may issue a command to execute the copy by clicking box 1130, or may cancel the specified copy operation by clicking box 1135.

Figure 10:
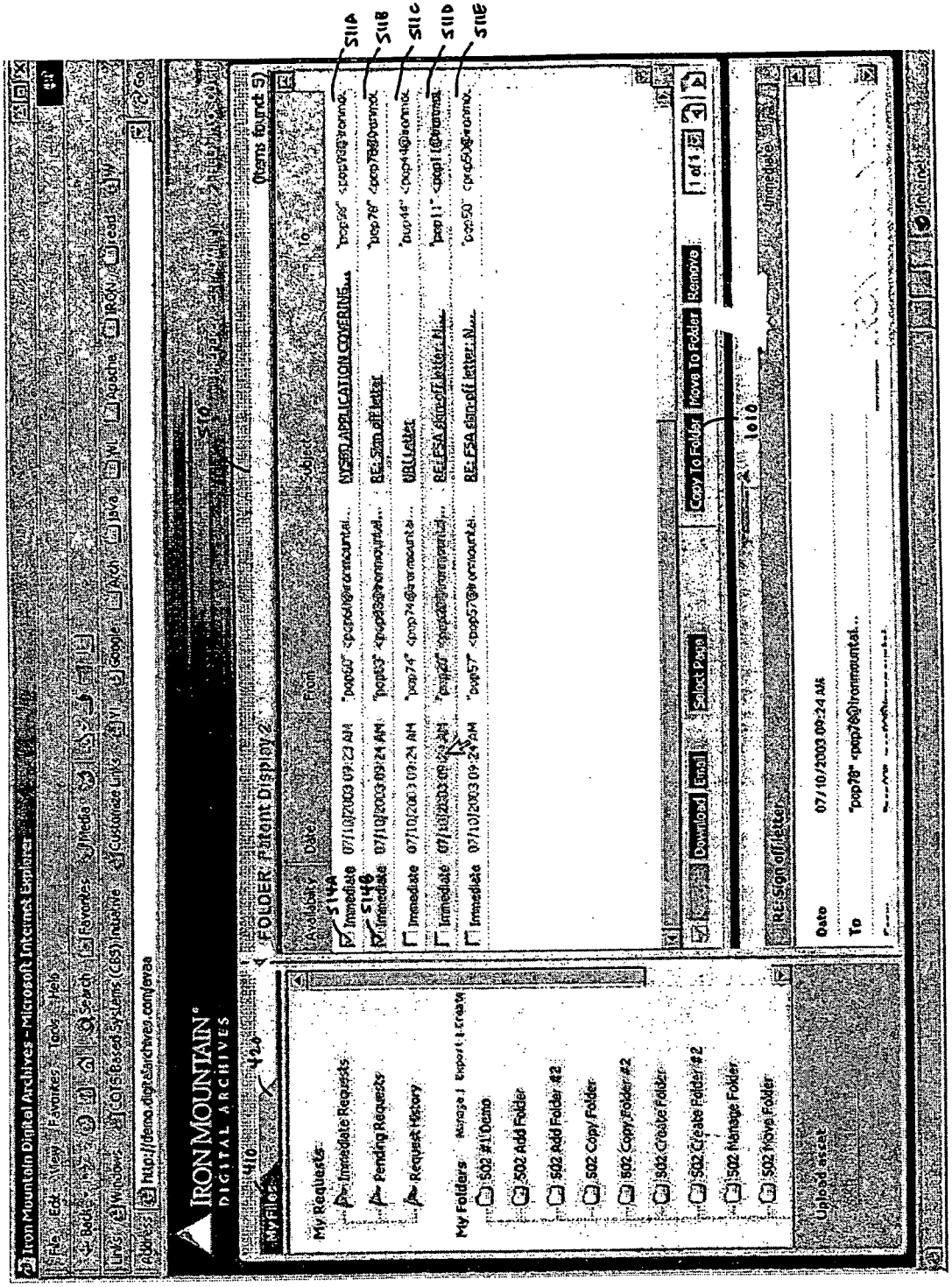
FIG. 10 is an illustration of an exemplary user interface by means of which a user may select search results to copy to another location, according to some embodiments of the invention.
Figure 12:
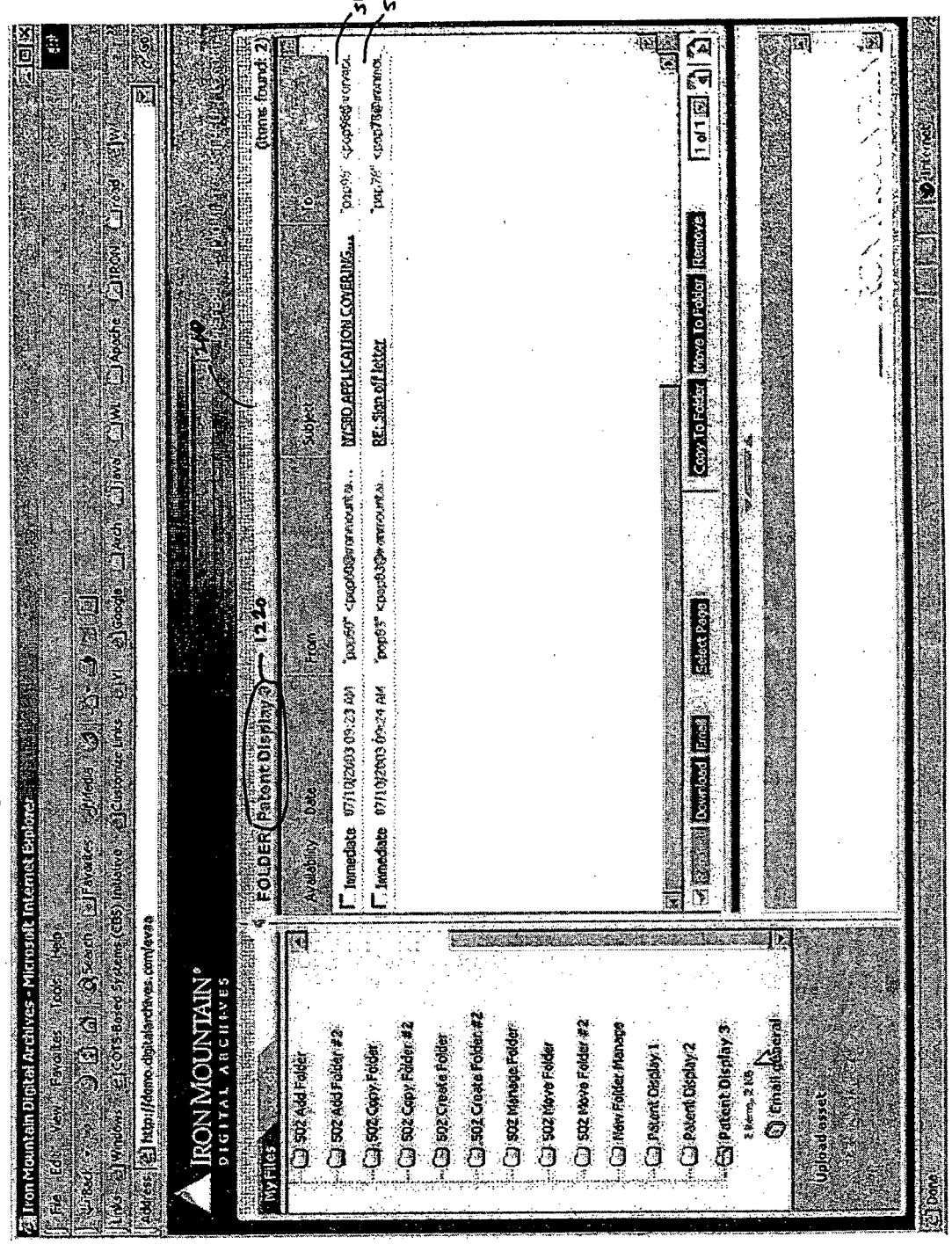
FIG. 12 is an illustration of an exemplary user interface which displays search results which have been copied to a location, according to some embodiments of the invention.

In some embodiments, clicking box 1130 launches interface 1201, shown in FIG. 12. Interface 1201 includes portion 1210, which indicates that the folder specified using interface 1101 ("Patent Display 3," specified by box 1115) has been created, and contains search results 511A-511B, which had been selected using interface 1001 (FIG. 10).

As part of the copy operation, an association may be created between the copies of resources corresponding to search results 511A-511B and the destination folder "Patent Display 3" by adding information to the data structure of FIG. 9. Specifically, if the operation involves a physical duplication of the resources (e.g., if a snap shot of the resources is created), then information may be added to the resource table 910 (e.g., a new row for each of the resources). If the copy operation does not involve a physical duplication of the resources, a logical relationship between the resources and the folders may be created, for example, by adding information (e.g., a new row) to the folder table 930 and resource-folder table 920 to provide an indication of this relationship.

Alternatively, a user may move a resource from one system location to another. In some embodiments, a move operation may be initiated using interface 1301, shown in FIG. 13. Interface 1301 includes portion 1210 (described above with reference to FIG. 12). Portion 1210 includes search results 511A-511B, which have check boxes 1311A-1311B selected. A user may initiate an operation to move the resources represented by the selected search results by clicking button 1320.

Figure 13:
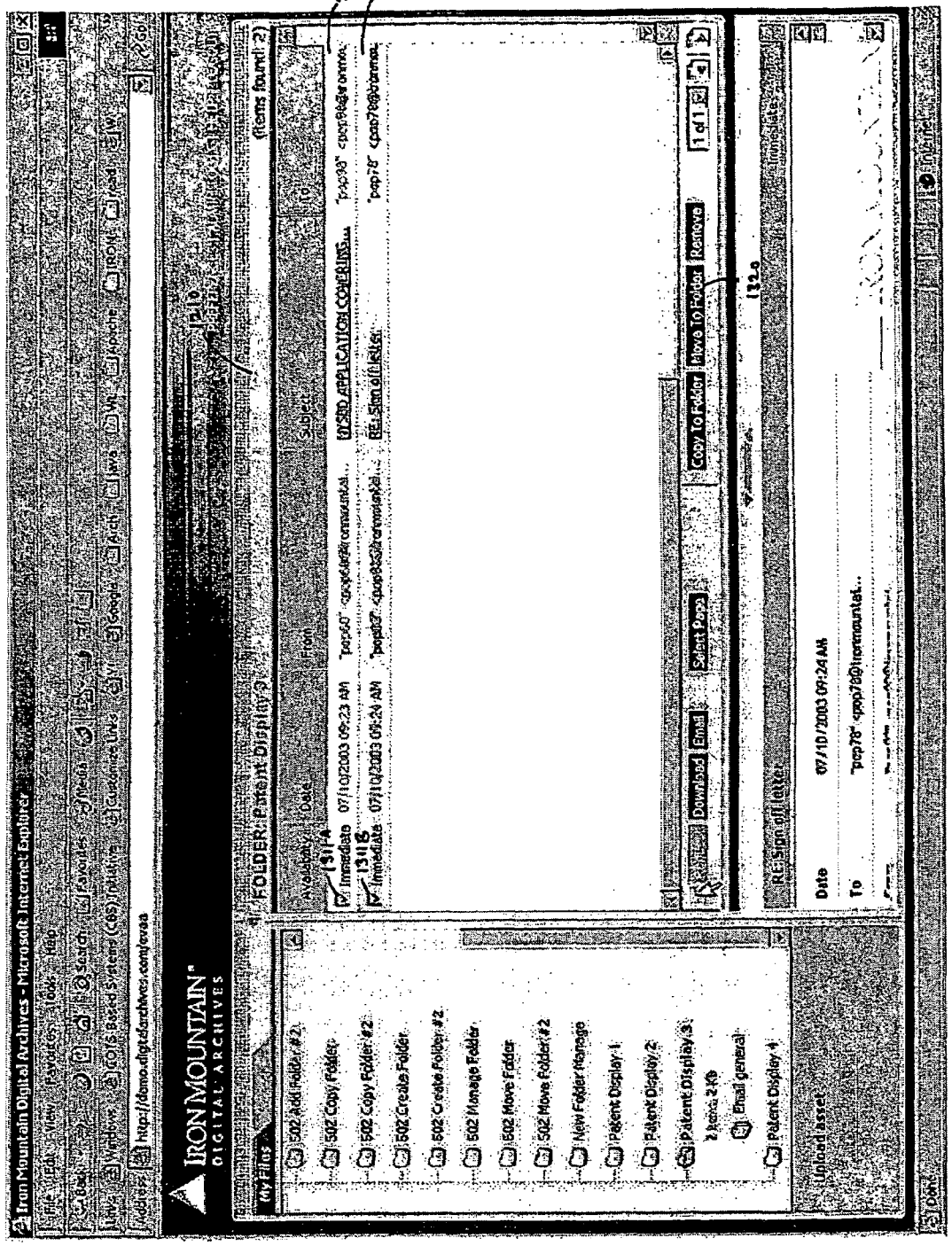
FIG. 13 is an illustration of an exemplary user interface by means of which a user may select search results to move to another location, according to some embodiments of the invention.
Figure 14:
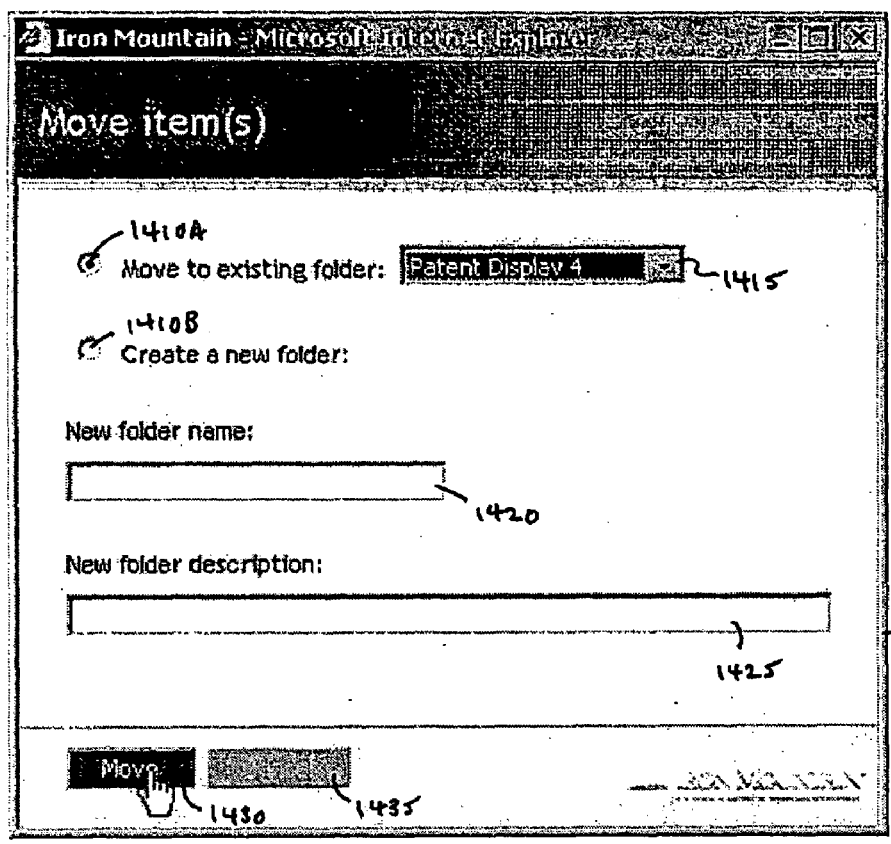
FIG. 14 is an illustration of an exemplary user interface by means of which a user may specify a location to which a preserved search result should be moved, according to some embodiments of the invention.

In some embodiments, clicking button 1320 launches the interface 1401, shown in FIG. 14. Interface 1401 includes buttons 1410A and 1410B, with which a user may specify that selected resources should be moved to an existing folder or a new folder, respectively. If button 1410A is selected, a user may select from a list of existing folders (e.g., the "Patent Display 4" folder, to which a user has indicated that the resources are to be moved) which are displayed by clicking on drop-down box 1415. If button 1410B is selected, the user may specify a new folder name in box 1420, and/or a description for the new folder in box 1425. The user may proceed with an operation to move the selected resources, according to the above-described criteria, by clicking box 1430. Alternatively, the user may cancel the operation by clicking box 1435. In some embodiments, clicking box 1435 causes interface 1401 to disappear and the user to be returned to interface 1301 (FIG. 13).

As with the copy operation described above, the move operation may include the creation of an association between the resources corresponding to selected search results 511A-511B and the destination folder "Patent Display 4." This association may be created by adding data to the data structure of FIG. 9. Specifically, if the operation involves a physical duplication of the resources, then information may be added to the resource table 910 (e.g., a new row for each of the resources). If the copy operation does not involve a physical duplication of the resources, a logical relationship between the resources and the folders may be created, for example, by adding information (e.g., a new row) to the folder table 930 and resource-folder table 920 to provide an indication of this relationship.

Referring again to FIG. 3, upon the completion of act 335, the process proceeds to act 340, wherein a user may request that one or more resources, maintained in one or more system locations, be exported. An exported resource may take any of numerous forms, such as a CD-ROM, a hard copy, or some other physical manifestation(s) of the electronic resource.

Figure 16:
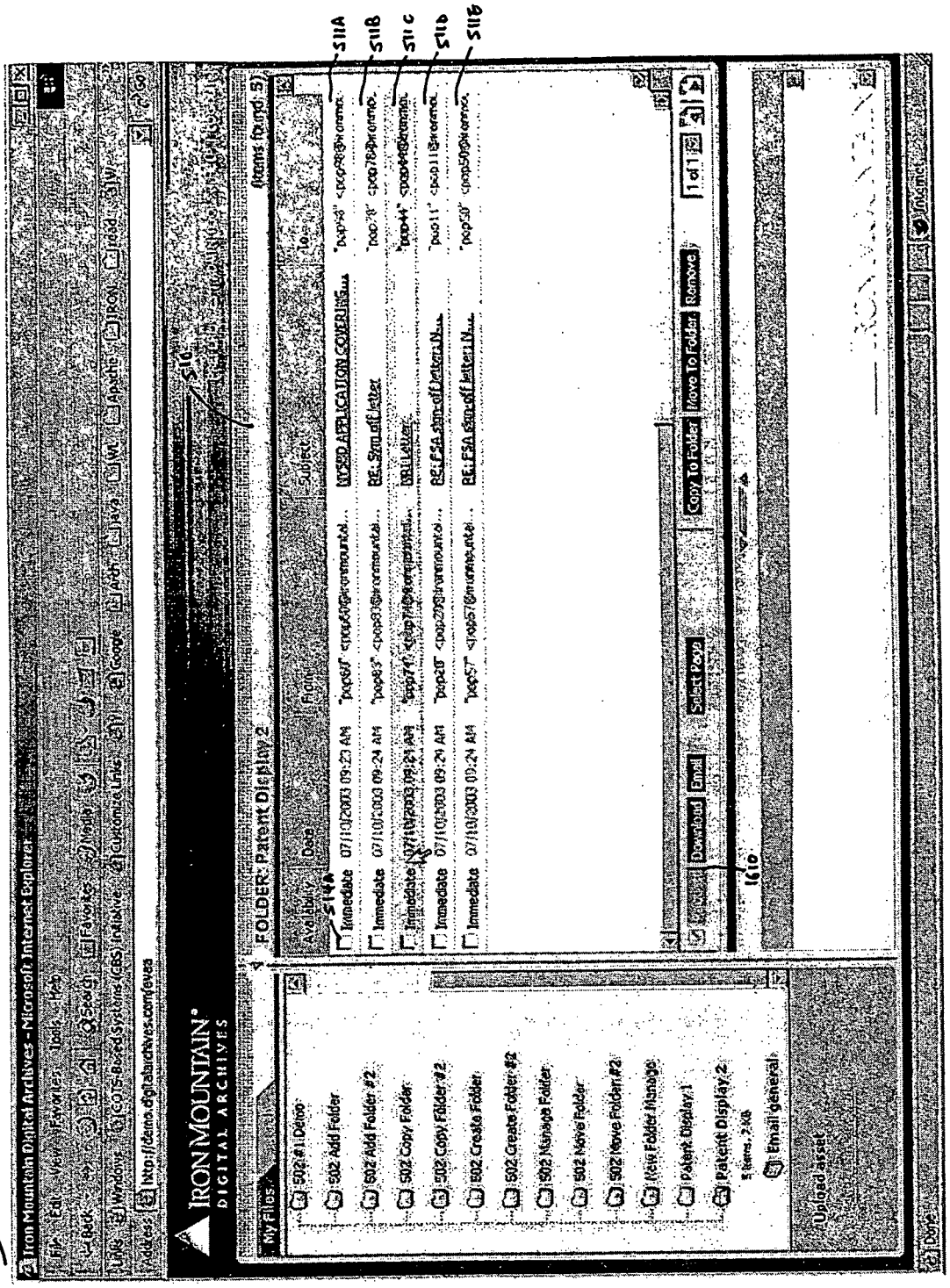
FIG. 16 is an illustration of an exemplary user interface by means of which a user may select one or more resources for export, according to some embodiments of the invention.

In some embodiments, a user may select one or more resources for export using the interface 1601, shown in FIG. 16. Interface 1601 includes portion 510 (described above with reference to FIG. 5), which depicts search results 511A-511E. Each of the search results has a respective check box 514. In some embodiments, upon clicking any of boxes 514, a user may click button 1610 to request that resources corresponding to the selected search results be exported.

Figure 17:
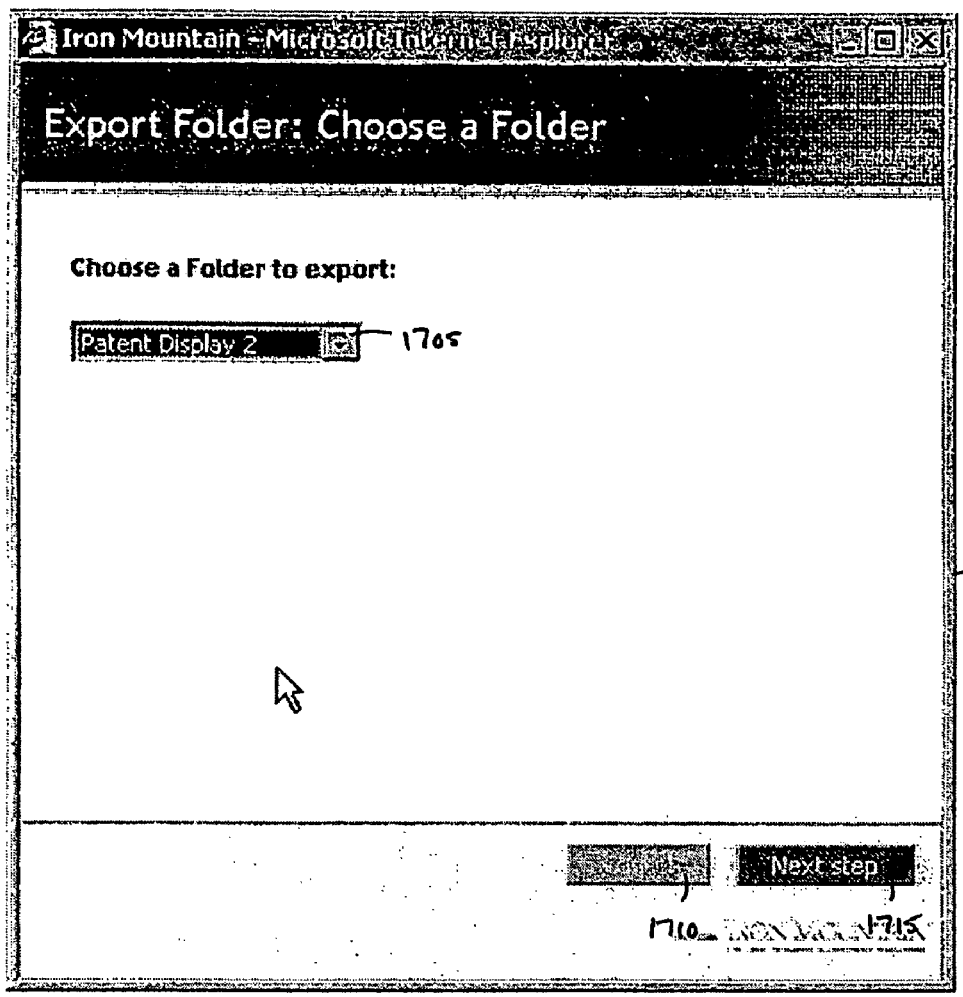
FIG. 17 is an illustration of an exemplary user interface by means of which the user may select a folder whose contents are to be exported, according to some embodiments of the invention.

In some embodiments, clicking box 1610 launches interface 1701, shown in FIG. 17. Interface 1701 includes drop-down box 1705, which enables a user to select from a list of folders from which the resources should be exported. In some embodiments, the folder displayed in box 1705 "defaults" to the folder displayed in FIG. 16. By clicking box 1710, a user may cancel an export operation. By clicking box 1715, a user may proceed to subsequent steps of the export operation.

Figure 18:
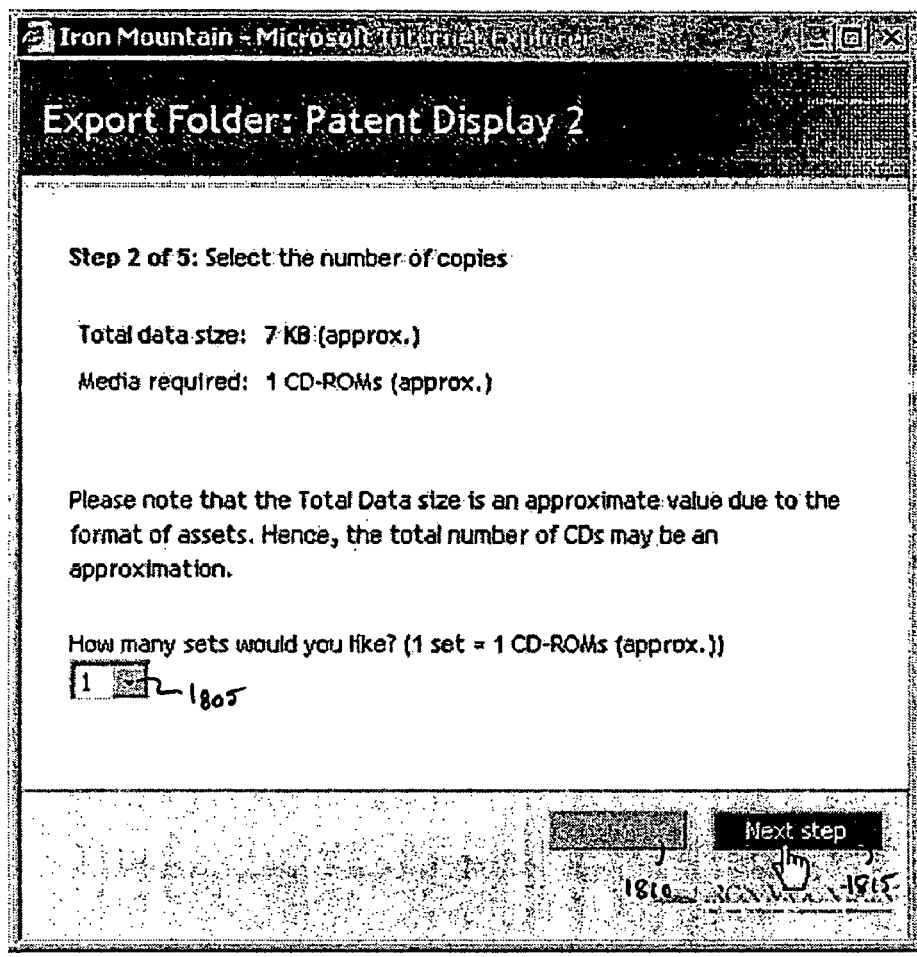
FIG. 18 is an illustration of an exemplary user interface by which a user may select a number of copies of a set of resources to export, according to some embodiments of the invention.

In some embodiments, clicking box 1715 launches interface 1801, shown in FIG. 18. With interface 1801, and more specifically with drop-down box 1805, a user may specify a number of copies of exported materials to produce. Any suitable number of copies may be ordered, as the invention is not limited in this regard. A user may cancel the export operation by clicking on box 1810, or proceed to a next in the export operation by clicking box 1815.

Figure 19:
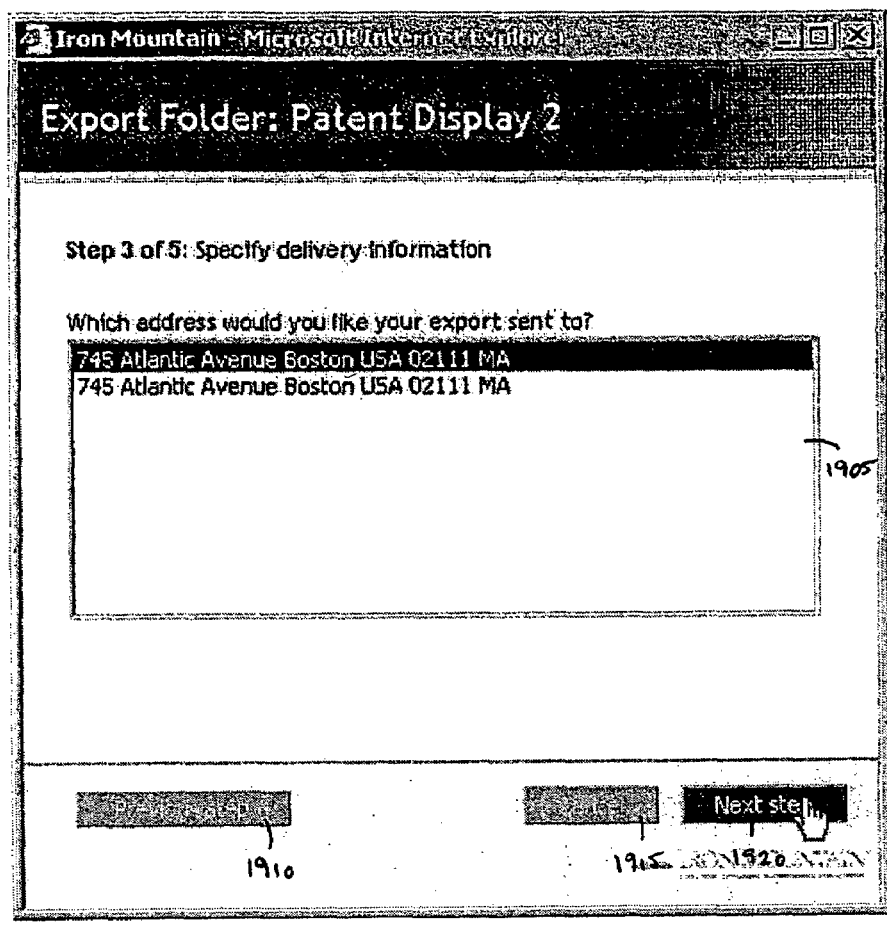
FIG. 19 is an illustration of an exemplary user interface by means of which a user may indicate a destination for exported copies of a set of resources, according to some embodiments of the invention.

In some embodiments, clicking box 1815 launches interface 1901, shown in FIG. 19. Using interface 1901, a user may select a destination to which exported materials should be sent. Specifically, box 1905 allows a user to select a particular address to which the materials should be shipped. In some embodiments, box 1905 may only allow a user to select from one or more "authorized" addresses. For example, by restricting the addresses shown in box 1905 to authorized addresses, the system may prevent a user from shipping sensitive materials to, for example, the user's home address, for security reasons. In another example, box 1905 may only allow a user to select from addresses associated with the user's department and/or division. Any suitable address data may be provided by box 1905.

A user may return to the previous step in the export process (e.g., the interface 1801) by clicking box 1910, cancel the export operation by clicking box 1915, or proceed with a next step in the export operation by clicking box 1920.

Figure 20:
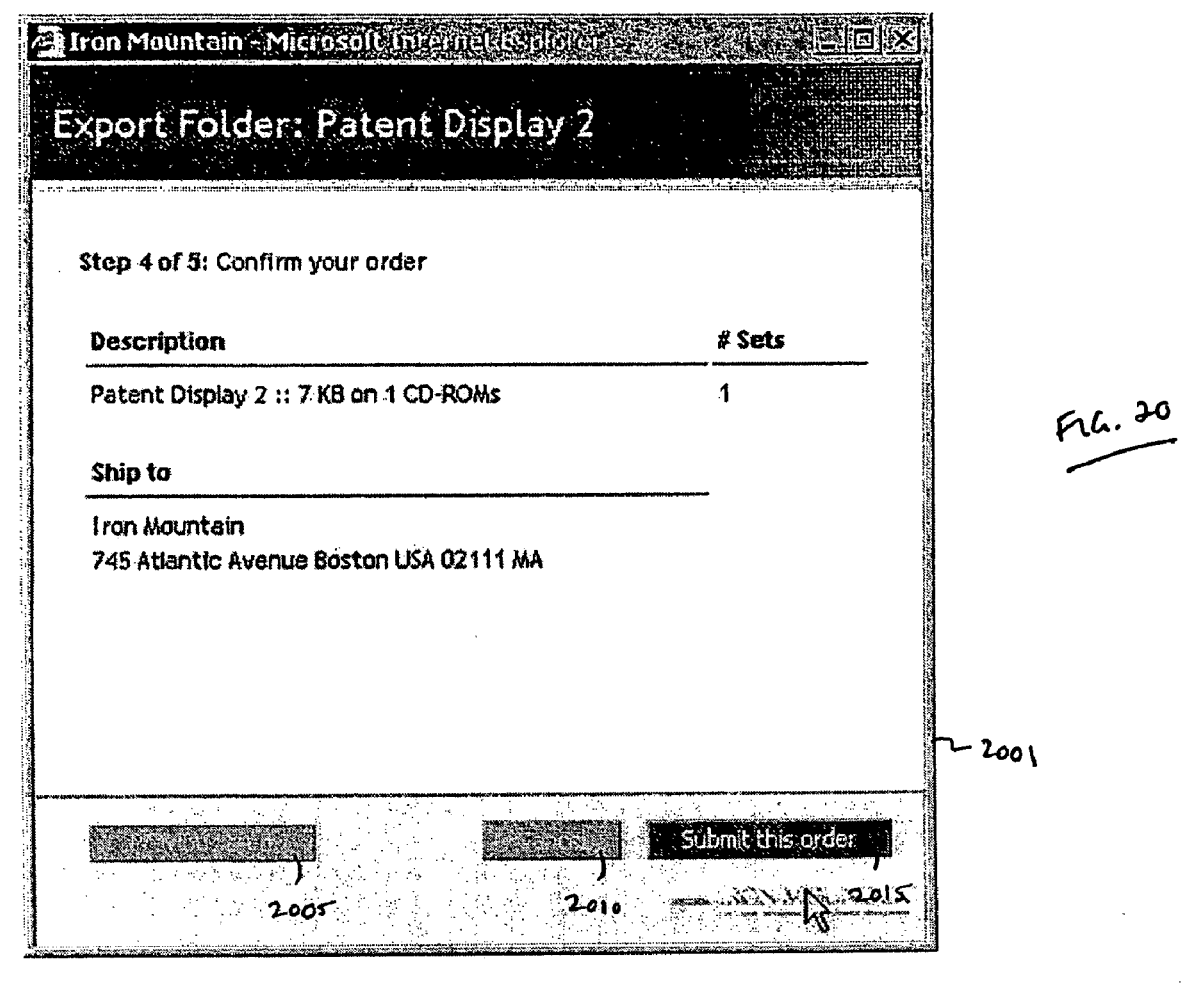

In some embodiments, clicking box 1920 launches interface 2001, shown in FIG. 20. Interface 2001 includes text specifying the details of the material to be exported. A user may return to a previous step in the export procedure by clicking box 2005, cancel the export operation by clicking box 2010, or cause a command to the issued to export the selected resources, according to the text provided in interface 2001 by clicking box 2015. By clicking on box 2015, the user completes the act 340 (FIG. 3).

Upon the completion of act 340, the process proceeds to act 345, wherein selected resources are exported. The act 345 may be performed in a manual, semi-automated, or fully automated fashion, as the invention is not limited to a particular implementation. In one example, by clicking box 2015 (i.e., in act 340), a user may cause a command to be issued to a system administrator, who may extract the specified resources from electronic file storage. Specifically, because search results may include catalogs and/or indices, a user may need to segregate or copy resources found therein. Upon receiving the command, the administrator may access the resources by performing one or more manual acts, such as mounting one or more tapes on which the resources are stored. To export the specified resources, the administrator may copy them to one or more suitable physical media (e.g., a CD-ROM, paper copy, or other suitable medium). Upon the completion of the act 345, the process completes.

III. Conclusion

The above-described aspects of the present invention and exemplary embodiments thereof may be implemented in any of numerous ways. For example, any subset of the above-described features may be implemented in combination, as the invention is not limited to being wholly implemented. The acts comprising the method described with reference to FIG. 3 may be performed in any suitable manner, including in a sequence which is different than the one described, and/or in a sequence in which one or more acts are performed in parallel.

Further, the method described with reference to FIG. 3 may be practiced by software and/or hardware, which those skilled in the art may readily formulate from this functional and partly structural definition. When implemented in software, the software code can be executed on any suitable processor or collection of processors, whether provided in a single computer or distributed among multiple computers. It should further be appreciated that any component or collection of components that perform the functions described above can be generically considered as one or more controllers that control the above-discussed functions. The one or more controllers may be implemented in any of numerous ways, such as with dedicated hardware, or with general purpose hardware that is programmed using microcode or software to perform the functions recited above. In this respect, it should be appreciated that one implementation of the embodiments of the present invention may comprise at least one computer-readable medium (e.g., a computer memory, floppy disk, compact disk, tape, etc.) encoded with a computer program (i.e., a plurality of programmed instructions) which, when executed on a processor, performs the above-discussed functions of the illustrated embodiments of the present invention. The computer-readable medium can be transportable such that the program stored thereon can be loaded onto any computer system resource to implement the aspects of the present invention described herein. In addition, it should be appreciated that the reference to a computer program, which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented via a computer-readable medium, the processes may, during the course of their execution, receive input manually (e.g., from a user), in the manners described above. In particular, the processors may receive input from one or more graphical user interfaces (GUIs). The one or more GUIs, although described herein to be implemented either in compliance with the Microsoft Windows® standard or with a web browser, may be implemented in any suitable manner. In this respect, GUIs need not execute on a personal computer, and may execute on a personal digital assistant (PDA), cellular phone, or other suitably adapted electronic device.

The processes are not limited to receiving input only from human users, however. In particular, the processes may receive input from other automated or semi-automated facilities, such as one or more application programming interfaces (APIs), stand-alone applications, services (e.g., services implemented on the WWW or the like), or a combination thereof. Input to the processes may be provided by any suitable facility, and may be provided, in whole or in part, without the active involvement of a human operator.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

What is claimed is:

1. A computer-implemented method for facilitating access to resources which are included in a data collection, each of the resources comprising a self-contained module of data and having content, the data collection comprising a plurality of the resources, the method comprising computer-implemented acts of:
   (A) executing a search query on the data collection using a search engine to produce at least one search result, the search query specifying at least one criterion, each at least one search result identifying a subset of the resources that satisfy the at least one criterion, and saving the search query;
   (B) after executing the search query, accepting input, from a user via a graphical user interface, the input comprising a selection of at least one resource from the at least one search result, for preserving the selected at least one resource in a computer system location that is different from the data collection,
      wherein the computer system location comprises a selected preserved content folder created based on input from the user, and
      wherein preserving the selected at least one resource comprises preserving content of the selected at least one resource maintained in the state at which the content existed at the time of preservation;
   (C) after the user's selection of the at least one resource from the at least one search result, designating the computer system location in which the content of the selected at least one resource is to be preserved;
   (D) using a processor to execute, in response to the user's selection, a command for preserving the content of the selected at least one resource in the computer system location and adding the preserved content to a second computer system location;
   (E) selecting, from the selected preserved content folder, the preserved at least one resource and selecting an export destination; and
   (F) exporting the selected preserved at least one resource to the export destination.

2. The method of claim 1, wherein the at least one resource has an identifier which facilitates access to the at least one resource.

3. The method of claim 1, wherein the act (F) further comprises exporting the selected preserved at least one resource to at least one of a CD-ROM or a paper copy.

4. The method of claim 1, wherein the act (F) is performed in at least one of a manual and semi-automated manner.

5. The method of claim 1, wherein adding the preserved content to the second computer system location further comprises copying the selected at least one resource from the computer system location to the second computer system location.

6. The method of claim 5, wherein copying is performed in response to a command from a user.

7. The method of claim 5, wherein copying is performed by creating a relationship in at least one persistent data store between each selected at least one resource and the second computer system location.

8. The method of claim 1, wherein adding the preserved content to the second computer system location further comprises moving the selected at least one resource from the computer system location to the second computer system location.

9. The method of claim 8, wherein moving is performed in response to receiving a command from a user.

10. The method of claim 8, wherein moving is performed by creating a relationship in at least one persistent data store between each selected at least one resource and the second computer system location.

11. The method of claim 1, wherein the user is a human operator.

12. The method of claim 1, wherein the at least one criterion is from the user.

13. A computer-readable medium encoded with instructions which, when executed by a computer, perform a computer-implemented method for facilitating access to resources which are included in a data collection, each of the resources comprising a self-contained module of data and having content, the data collection comprising a plurality of the resources, the method comprising computer-implemented acts of:
   (A) executing a search query on the data collection using a search engine to produce at least one search result, the search query specifying at least one criterion, each at least one search result identifying a subset of the resources that satisfy the at least one criterion, and saving the search query;
   (B) after executing the search query, accepting input, from a user via a graphical user interface, the input comprising a selection of at least one resource from the at least one search result, for preserving the selected at least one resource in a computer system location that is different from the data collection
      wherein the computer system location comprises a selected preserved content folder created based on input from the user, and wherein preserving the selected at least one resource comprises preserving content of the selected at least one resource maintained in the state at which the content existed at the time of preservation;

(C) after the user's selection of the at least one resource from the at least one search result, designating the computer system location in which the content of the selected at least one resource is to be preserved;

(D) using a processor to execute, in response to the user's selection, a command for preserving the content of the selected at least one resource in the computer system location and adding the preserved content to a second computer system location;

(E) selecting, from the selected preserved content folder, the preserved at least one resource and selecting an export destination; and (F) exporting the selected preserved at least one resource to the export destination.

14. The computer-readable medium of claim 13, wherein the at least one resource has an identifier which facilitates access to the at least one resource.

15. The computer-readable medium of claim 14, wherein the act (F) further comprises exporting the selected preserved at least one resource to at least one of a CD-ROM or a paper copy.

16. The computer-readable medium of claim 14, wherein the act (F) is performed in at least one of a manual and semi-automated manner.

17. The computer-readable medium of claim 13, wherein adding the preserved content to the second computer system location further comprises copying the selected at least one resource from the computer system location to the second computer system location.

18. The computer-readable medium of claim 17, wherein copying is performed in response to a command from a user.

19. The computer-readable medium of claim 17, wherein copying is performed by creating a relationship in at least one persistent data store between each selected at least one resource and the second computer system location.

20. The computer-readable medium of claim 13, wherein adding the preserved content to the second computer system location further comprises moving the selected at least one resource from the computer system location to the second computer system location.

21. The computer-readable medium of claim 20, wherein moving is performed in response to receiving a command from a user.

22. The computer-readable medium of claim 20, wherein moving is performed by creating a relationship in at least one persistent data store between each selected at least one resource and the second computer system location.

23. The computer-readable medium of claim 13, wherein the user is a human operator.

24. The computer-readable medium of claim 13, wherein the at least one criterion is from the user.

25. A computer system for facilitating access to resources which are included in a data collection, each of the resources comprising a self-contained module of data and having content, the data collection comprising a plurality of the resources, the system comprising:

a search controller to execute a search query on the data collection to produce at least one search result, the search query specifying at least one criterion, each at least one search result identifying a subset of the resources that satisfy the at least one criterion, and saving the search query;

an input controller to accept input, from a user via a graphical user interface, the input comprising a selection of at least one resource from the at least one search result, for preserving the selected at least one resource in a computer system location that is different from the data collection, wherein the computer system location comprises a selected preserved content folder created based on input from the user, and wherein preserving the selected at least one resource comprises preserving content of the selected at least one resource maintained in the state at which the content existed at the time of preservation;

a controller to designate the computer system location in which the content of the selected at least one resource is to be preserved after the user's selection of the at least one resource from the at least one search result; and a command controller:

to execute, in response to the user's selection provided to the input controller, a command for preserving the content of the selected at least one resource in the computer system location and adding the preserved content to a second computer system location;

to select, from the selected preserved content folder, the preserved at least one resource and to select an export destination; and to export the selected preserved at least one resource to the export destination.

26. The computer system of claim 25, wherein the at least one resource has an identifier which facilitates access to the at least one resource.

27. The computer system of claim 25, wherein the command controller further exports the selected preserved at least one resource to at least one of a CD-ROM or a paper copy.

28. The computer system of claim 25, wherein the command for adding the preserved content to the second computer system location further comprises a command for copying the selected at least one resource from the computer system location to the second computer system location.

29. The computer system of claim 28, wherein the command controller creates a relationship in at least one persistent data store between each of the selected at least one resources and the second computer system location.

30. The computer system of claim 25, wherein the command for adding the preserved content to the second computer system location further comprises a command for moving the selected at least one resource from the computer system location to the second computer system location.

31. The computer system of claim 30, wherein the command controller creates a relationship in at least one persistent data store between each selected at least one resource and the second computer system location.

32. The system of claim 25, wherein the user is a human operator.

33. The system of claim 25, wherein the at least one criterion is from the user.

34. The computer-implemented method of claim 1, wherein at least one of the resources in the data collection comprises a document.

35. The computer-implemented method of claim 1, wherein the act (D) further comprises duplicating the selected at least one resource in the computer system location.

36. The computer-implemented method of claim 1, wherein the act (D) further comprises preserving the selected at least one resource in the state in which the at least one resource respectively existed at a time at which the act (A) is performed.

37. The computer-readable medium of claim 13, wherein at least one of the resources in the data collection comprises a document.

38. The computer-readable medium of claim 13, wherein the act (D) further comprises duplicating the selected at least one resource in the computer system location.

39. The computer-readable medium of claim 13, wherein the act (D) further comprises preserving the selected at least one resource in the state in which the at least one resource respectively existed at a time at which the act (A) is performed.

40. The system of claim 25, wherein at least one of the resources in the data collection comprises a document.

41. The system of claim 25, wherein the command controller is further operable to duplicate the selected at least one resource in the computer system location.

42. The system of claim 25, wherein the command controller is further operable to preserve the selected at least one resource in the state in which the at least one resource respectively existed at a time at which the search controller produces the at least one search result.

43. The computer-implemented method of claim 35, wherein duplicating further comprises physically duplicating the selected at least one resource in the computer system location.

44. The computer-implemented method of claim 35, wherein duplicating further comprises updating at least one persistent data store to provide a logical relationship between the at least one resource and the computer system location.

45. The computer-readable medium of claim 38, wherein duplicating further comprises physically duplicating the selected at least one resource in the computer system location.

46. The computer-readable medium of claim 38, wherein duplicating further comprises updating at least one persistent data store to provide a logical relationship between the at least one resource and the computer system location.

47. The system of claim 41, wherein duplicating further comprises physically duplicating the selected at least one resource in the computer system location.

48. The system of claim 41, wherein duplicating further comprises updating at least one persistent data store to provide a logical relationship between the at least one resource and the computer system location.

* * * * *